United States Patent
Bajwa (10) Patent No.: US 12,469,585 B1
(45) Date of Patent: Nov. 11, 2025

(54) MOBILE SENSING PLATFORM AND SYSTEM FOR MENTAL HEALTHCARE THAT UTILIZES THE HL7 FHIR STANDARD FOR SEAMLESS INTEGRATION OF DIFFERENT MOBILE DEVICES INTO THE HEALTH SYSTEM

(71) Applicant: Ozair Bajwa, San Diego, CA (US)

(72) Inventor: Ozair Bajwa, San Diego, CA (US)

(*) Notice: Subject to any disclaimer, the term of this patent is extended or adjusted under 35 U.S.C. 154(b) by 264 days.

(21) Appl. No.: 18/090,344

(22) Filed: Dec. 28, 2022

Related U.S. Application Data (60) Provisional application No. 63/273,027, filed on Oct. 28, 2021.

(51) Int. Cl.
  *G06Q 50/00* (2024.01)
  *G16H 10/65* (2018.01)
  *G16H 30/20* (2018.01)

(52) U.S. Cl.
  CPC ............. *G16H 10/65* (2018.01); *G16H 30/20* (2018.01)

(58) Field of Classification Search
  CPC ............................... G16H 10/65; G16H 30/20
  See application file for complete search history.

(56) References Cited

U.S. PATENT DOCUMENTS

| | | | |
|---|---|---|---|
| 7,617,504 B1 * | 11/2009 | Hill ........................ | G06F 9/548 |
| | | | 709/213 |
| 9,111,017 B2 * | 8/2015 | Duma .................. | H04N 1/2104 |
| 10,977,796 B2 * | 4/2021 | Vincent ................. | G16H 30/20 |
| 11,443,838 B1 * | 9/2022 | Cordonnier ............ | G16H 50/20 |
| 2005/0273367 A1 * | 12/2005 | Nourie ................... | G16H 10/60 |
| | | | 705/3 |
| 2019/0384849 A1 * | 12/2019 | Sundararaman ....... | G16H 30/20 |
| 2020/0226106 A1 * | 7/2020 | Serlie .................... | G06F 16/212 |
| 2020/0311938 A1 * | 10/2020 | Vincent ................. | G16H 30/20 |
| 2022/0133279 A1 * | 5/2022 | Bricker .................. | G16H 50/00 |
| | | | 600/438 |
| 2024/0021280 A1 * | 1/2024 | Barnard ................. | G16H 10/40 |
| 2024/0203551 A1 * | 6/2024 | Casey .................... | H04L 9/088 |

FOREIGN PATENT DOCUMENTS

| | | | | |
|---|---|---|---|---|
| CN | 114124748 A | * | 3/2022 | ............. H04L 43/08 |
| CN | 110659028 B | * | 2/2023 | ............... G06F 8/38 |
| CN | 111400408 B | * | 6/2023 | ............. G06F 16/27 |
| WO | WO-2007047588 A1 | * | 4/2007 | ........... G06F 19/321 |

* cited by examiner

*Primary Examiner* — Rajesh Khattar
(74) *Attorney, Agent, or Firm* — Plager Schack LLP; Mark H. Plager; Stephen Hallberg (57) ABSTRACT

A mobile sensing platform and system for mental healthcare that supports seamless integration of different mobile devices into the health system is disclosed. The mobile sensing platform and system for mental healthcare uses the HL7 FHIR standard to seamlessly integrate the various, different mobile devices into the health system.

12 Claims, 6 Drawing Sheets

MOBILE SENSING PLATFORM AND SYSTEM FOR MENTAL HEALTHCARE THAT UTILIZES THE HL7 FHIR STANDARD FOR SEAMLESS INTEGRATION OF DIFFERENT MOBILE DEVICES INTO THE HEALTH SYSTEM

CLAIM OF BENEFIT TO PRIOR APPLICATION

This application claims benefit to U.S. Provisional Patent Application 63/273,027, entitled "MOBILE SENSING PLATFORM AND SYSTEM FOR MENTAL HEALTHCARE THAT UTILIZES THE HL7 FHIR STANDARD FOR SEAMLESS INTEGRATION OF DIFFERENT MOBILE DEVICES INTO THE HEALTH SYSTEM," filed Oct. 28, 2021. The U.S. Provisional Patent Application 63/273,027 is incorporated herein by reference.

BACKGROUND

Embodiments of the invention described in this specification relate generally to medical sensor-based data systems, and more particularly, to a mobile sensing platform and system that utilizes a Fast Health Interoperability Resources (FHIR) standard implementation of a Health Level Seven International (HL7) specification for healthcare interoperability (hereinafter referred to as "HL7 FHIR") to provide seamless integration of different personal connected health appliances, personal health mobile devices, and personal health applications into a health system.

With the advent of mobile devices, patient data is scattered across various domains, thereby limiting access to real time data in a healthcare setting.

Some systems intend to provide mobile device sensing. However, to date, there is not standard and in the health care field, notably in the mental health field, a widely accepted mobile sensing platform standard is needed.

Also, many existing systems do not have a method for seamless integration of data from different mobile platforms (e.g., Android, IOS, etc.). As mobile platforms evolve they bring their own native software and drivers. Consequently, barriers are created in the ability to perform data interchange across a wide field in which data may be provided via several different mobile platforms.

Therefore, what is needed is a way to extend existing mobile devices and applications in ways that are capable of capturing data (especially user interaction data or "usage data") that is device-generic (any device, type, or brand) and to do so on a standardized platform for healthcare generally, and mental healthcare in particular, by implementing and utilizing the HL7 FHIR standard for seamless integration of the various different mobile devices, appliances, applications, and sensors.

BRIEF DESCRIPTION

A novel mobile sensing platform and system is disclosed for mental healthcare that utilizes the HL7 FHIR standard for seamless integration of different mobile devices into the health system. In some embodiments, the mobile sensing platform and system is configured to automate the integration and conversion of patient data from any of several distinct mobile platforms. In some embodiments, the mobile sensing platform and system is configured to capture data passively and unobtrusively in real time from the mobile devices across the distinct mobile platforms.

In some embodiments, the mobile sensing platform and system provides seamless integration of a personal health device (PHD) with a connected personal health appliance (PHA) that is configured to detect and provide health data as a data source to upload to a FHIR server that implements the HL7 FHIR standard and is configured to accept data that conforms to the HL7 FHIR standard.

In some embodiments, the mobile sensing platform and system provides seamless integration of a personal health device (PHD) with a particular software application installed. In some embodiments, the particular software application is a Flutter application comprises a Flutter software library and packages associated with a particular programming language suitable for device interoperability and data interchange. In some embodiments, the particular programming language is Dart. In some embodiments, the Flutter application functions as a data source to a personal health gateway through which data from the PHD is decoded to a format applicable for converting to Dart and uploading to the FHIR server.

In some embodiments, the mobile sensing platform and system provides seamless integration of a personal health device (PHD) with the Flutter library and packages embedded to provide usage data for digital phenotyping after the usage data is formatted and converted into a form that satisfies the HL7 FHIR standard and, thereafter, uploaded to the FHIR server.

In some embodiments, the mobile sensing platform and system provides seamless integration of all devices and data sources including at least the PHD with the connected personal health appliance (PHA), the PHD with the particular software application installed, and the PHD with the Flutter library and packages embedded to provide usage data for digital phenotyping.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of a mobile sensing platform and system are described. The mobile sensing platform and system implements the Fast Health Interoperability Resources (FHIR), which is a Health Level Seven International (HL7) specification for healthcare interoperability. In particular, the mobile sensing platform and system implements the HL7 FHIR standard for seamless integration of different mobile devices, applications, and appliances into any given health care system. However, it will be clear and apparent to one skilled in the art that the invention is not limited to the embodiments set forth and that the invention can be adapted for any of several applications. Also, all standards specified in this disclosure are by way of example only and are not intended to be limiting. Instead, the embodiments described in this specification intend to cover such anticipated updates to these standards over time. Furthermore, the relational connections shown in these Figures are not necessarily fully encompassing of all elements or steps that may be present in a detailed view of the same. For instance, a mobile device connection to a cloud server may be simply depicted in a one-to-one relationship, while a detailed view of the same may include hardware components such communication towers, wireless gateway devices, firewall appliances, routers, etc. As will be understood by those of ordinary skill in the relevant art, the actual elements, steps, and relationships between them, for any system, any device, combinations of a system and devices, or any part of a system or device disclosed in this specification will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment", "an embodiment", or "some embodiments" is intended to indicate that a particular feature, structure, or characteristic described in connection with the embodiment or embodiments is included in at least one embodiment, and possibly multiple embodiments, of the invention. The appearances of the phrases "in one embodiment", "an embodiment", or "some embodiments" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises", and "comprised" are not intended to exclude other additives, components, integers, or steps.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

Some embodiments of the invention include a novel mobile sensing platform and system for mental healthcare that utilizes the HL7 FHIR standard for seamless integration of different mobile devices into the health system. In some embodiments, the mobile sensing platform and system is configured to automate the integration and conversion of patient data from any of several distinct mobile platforms. In some embodiments, the mobile sensing platform and system is configured to capture data passively and unobtrusively in real time from the mobile devices across the distinct mobile platforms.

In some embodiments, the mobile sensing platform and system provides seamless integration of a personal health device (PHD) with a connected personal health appliance (PHA) that is configured to detect and provide health data as a data source to upload to a FHIR server that implements the HL7 FHIR standard and is configured to accept data that conforms to the HL7 FHIR standard.

In some embodiments, the mobile sensing platform and system provides seamless integration of a personal health device (PHD) with a particular software application installed. In some embodiments, the particular software application is a Flutter application comprises a Flutter software library and packages associated with a particular programming language suitable for device interoperability and data interchange. In some embodiments, the particular programming language is Dart. In some embodiments, the Flutter application functions as a data source to a personal health gateway through which data from the PHD is decoded to a format applicable for converting to Dart and uploading to the FHIR server.

In some embodiments, the mobile sensing platform and system provides seamless integration of a personal health device (PHD) with the Flutter library and packages embedded to provide usage data for digital phenotyping after the usage data is formatted and converted into a form that satisfies the HL7 FHIR standard and, thereafter, uploaded to the FHIR server.

In some embodiments, the mobile sensing platform and system provides seamless integration of all devices and data sources including at least the PHD with the connected personal health appliance (PHA), the PHD with the particular software application installed, and the PHD with the Flutter library and packages embedded to provide usage data for digital phenotyping.

As stated above, with the advent of mobile devices, patient data is scattered across various domains, thereby limiting access to real time data in a healthcare setting. Notably, some existing systems intend to provide mobile device sensing which may be connected to digital phenotyping to determine the impact of technology on its users. However, to date, there is no standardarization of a mobile sensing platform or digital phenotyping in the health care field, notably in the mental health field. Accordingly, a widely accepted mobile sensing platform standard is needed. Also, many existing systems do not have a method for seamless integration of data from different mobile platforms (e.g., Android, IOS, etc.). As mobile platforms evolve they bring their own native software and drivers. Consequently, barriers are created in the ability to perform data interchange across a wide field in which data may be provided via several different mobile platforms. Embodiments of the mobile sensing platform and system for mental healthcare that utilizes the HL7 FHIR standard for seamless integration of different mobile devices into the health system described in this specification solve such problems by automating the integration and conversion of patient data from mobile platforms, this software will capture data passively and unobtrusively in real time.

Embodiments of the mobile sensing platform and system for mental healthcare that utilizes the HL7 FHIR standard for seamless integration of different mobile devices into the health system described in this specification differ from and improve upon currently existing options. In particular, some embodiments differ by adapting a mobile sensing platform, which is the foundation for digital phenotyping but has not been implemented in healthcare, to conform with an industry backed standard, namely the HL7 FHIR standard.

This provides improvements over existing devices and sensor platforms which do not account for patient data from multiple sources and/or multiple different devices. The existing and conventional options currently available simply do not use the industry/government backed standard to translate and merge the data in one universal standard. As a result, the conventional existing systems and devices cannot interoperate or integrate with new devices and software. By contrast, the mobile sensing platform and system for mental healthcare that utilizes the HL7 FHIR standard for seamless integration of different mobile devices into the health system is built on the industry/government backed standard for inter-operation and integration with new devices and software systems and seamless data capture and provisioning into the health system. In this way, medical providers, clinicians or other stakeholders can rely on remote patient monitoring, data analytics and clinical decision support.

The mobile sensing platform and system for mental healthcare that utilizes the HL7 FHIR standard for seamless integration of different mobile devices into the health system of the present disclosure may be comprised of the following elements. This list of possible constituent elements is intended to be exemplary only and it is not intended that this list be used to limit the mobile sensing platform and system for mental healthcare that utilizes the HL7 FHIR standard for seamless integration of different mobile devices into the health system of the present application to just these elements. Persons having ordinary skill in the art relevant to the present disclosure may understand there to be equivalent elements that may be substituted within the present disclosure without changing the essential function or operation of the mobile sensing platform and system for mental healthcare that utilizes the HL7 FHIR standard for seamless integration of different mobile devices into the health system.

1. Personal Connected Health Appliances
   2. Mobile Devices
   3. Application Client
   4. FHIR Server
   5. Flutter/Dart (code)
   6. HL7 FHIR Standard
   7. Android Studio
   8. Java The various elements of the mobile sensing platform and system for mental healthcare that utilizes the HL7 FHIR standard for seamless integration of different mobile devices into the health system of the present disclosure may be related in the following exemplary fashion. It is not intended to limit the scope or nature of the relationships between the various elements and the following examples are presented as illustrative examples only. All Personal Connected Health Appliances (noted above at #1) and mobile devices are provisioned to communicate with the Application Client (noted above at #3). Device data can also be gathered from the Flutter/Dart (noted above at #5) libraries in the Application Client (noted above at #3). Data from Personal Connected Health Appliances (noted above at #1), Mobile Devices (noted above at #2) and from the Flutter/Dart (noted above at #5) code is converted to the HL7 FHIR standard (noted above at #6). The Flutter/Dart (noted above at #5) code is written in Android Studio (noted above at #7). Application client (noted above at #3) communicates Personal Connected Health Appliances (noted above at #1) and Mobile Devices (noted above at #2) using Java (noted above at #8). Application Client (noted above at #3) connects with the FHIR Server (noted above at #4) using Flutter/Dart (noted above at #5) and leverages the HL7 FHIR Standard (noted above at #6).

The mobile sensing platform and system for mental healthcare that utilizes the HL7 FHIR standard for seamless integration of different mobile devices into the health system of the present disclosure generally works as a software and network computer system that has connection channels for different device types. As the devices are registered and a connection is established, data flows from the devices to a Gateway where all data is converted to FHIR Standard and is matched to their respective patients. Based on the thresholds defined for the application, data will be uploaded to the FHIR Server.

To make the mobile sensing platform and system for mental healthcare that utilizes the HL7 FHIR standard for seamless integration of different mobile devices into the health system of the present disclosure, a person may design/architect a system that takes into account all the data points and applies the HL7 FHIR standard.

To use the mobile sensing platform and system for mental healthcare that utilizes the HL7 FHIR standard for seamless integration of different mobile devices into the health system of the present disclosure, a person may install on a smart device on-demand or through an app store. It is targeted to be used in a remote setting where patient data is collected, normalized and sent to a server where a provider can access it in real time, so connectivity of wireless data transmission of any sort would work (e.g., mobile/cellular, WiFi, Bluetooth, etc.).

Figure 1:
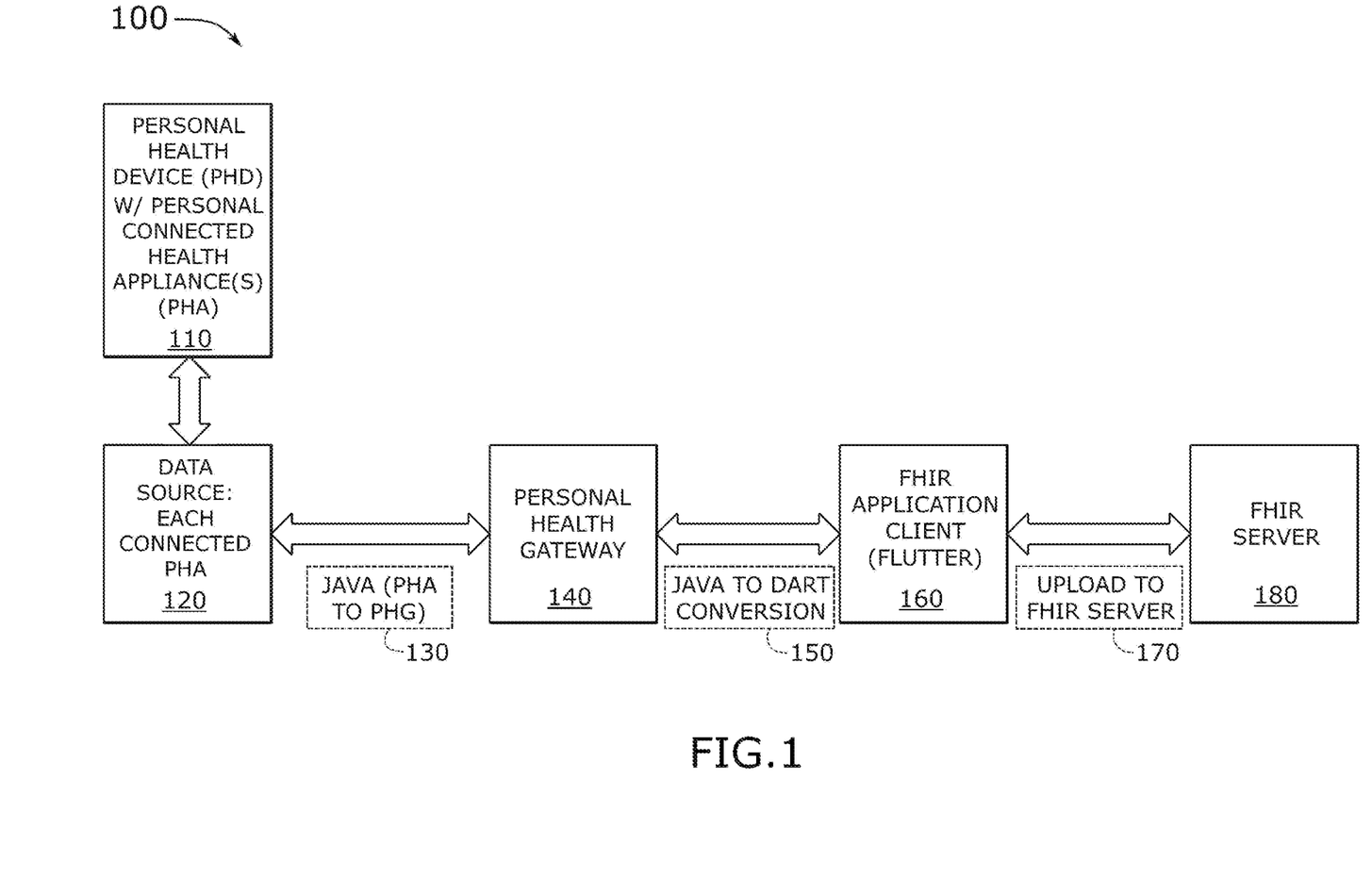
FIG. 1 conceptually illustrates seamless integration of a personal health device with a connected personal health appliance which is a data source to upload to a FHIR server in some embodiments.

By way of example, FIG. 1 conceptually illustrates seamless integration of a personal health device with a connected personal health appliance 100 which is a data source to upload to a FHIR server in some embodiments. As shown in this figure, a personal health device (PHD) with a connected personal health appliance (PHA) 110 provides a source of data based on the PHA. The PHA data source 120 may be data for a user's heart rate if the PHA is a heart monitor or the data may be fitness data based on a step counter, etc. Also, in some instances, multiple PHAs are connected to the user's PHD, and the source of data arises from each PHA.

When the PHA data source 120 is captured, an operation is needed to decode Java-based data structures connected to the PHA into a Jave format suitable for a personal health gateway 140. This step—Java PHA to PHG decoding 130—may be performed on the user's personal health device (PHD) when the personal health gateway 140 is installed as an embedded program on the PHD. Alternately, the personal health gateway 140 may be implemented on a separate device or appliance that is communicably connected to the PHD of the user. Either way, the central aspect of this is to provide the source data (that is, the PHA-based data) to the personal health gateway 140 in order to carry out a conversion of code that is appropriate for a client application configured to upload the PHA data to a FHIR server 180.

Therefore, stepping back, the personal health gateway 140 performs a conversion from one coding language to another coding language. Specifically, the personal health gateway converts the Java code associated with the PHA data received at the personal health gateway 140 into Dart code to provide to a FHIR application client 160. Specifically, the Java to Dart conversion 150 is performed because the FHIR application client 160 is a client application based on the Flutter framework. Moreover, Dart as a coding language and Flutter as an application framework are designed to work seamlessly together. Therefore, the step of converting the Java code to Dart code 150 is needed before the PHA data, sourced from the user's PHD to which the PHA is (or multiple PHAs are) connected, can be uploaded to the FHIR server, which happens next.

After the Java to Dart conversion 150 is complete, the FHIR application client 160 (or Flutter client 160) uploads the data 170 to the FHIR server 180. In this way, it is possible to have seamless interchange—regardless of the type of mobile device the user operates (or any other type of device which the user operates as the PHD)—of personal health data that user's routinely accumulate by one or more personal health appliances connected to their mobile device.

Besides providing seamlessly interchange of data sourced from personal health appliances, other data is relevant to the mobile sensing platform and system for mental healthcare that utilizes the HL7 FHIR standard for seamless integration of different mobile devices into the health system of the present disclosure. In the next example, a mobile app that runs on a personal health device provides any other kinds of data through the app. This is described next, by reference to FIG. 2.

Figure 2:
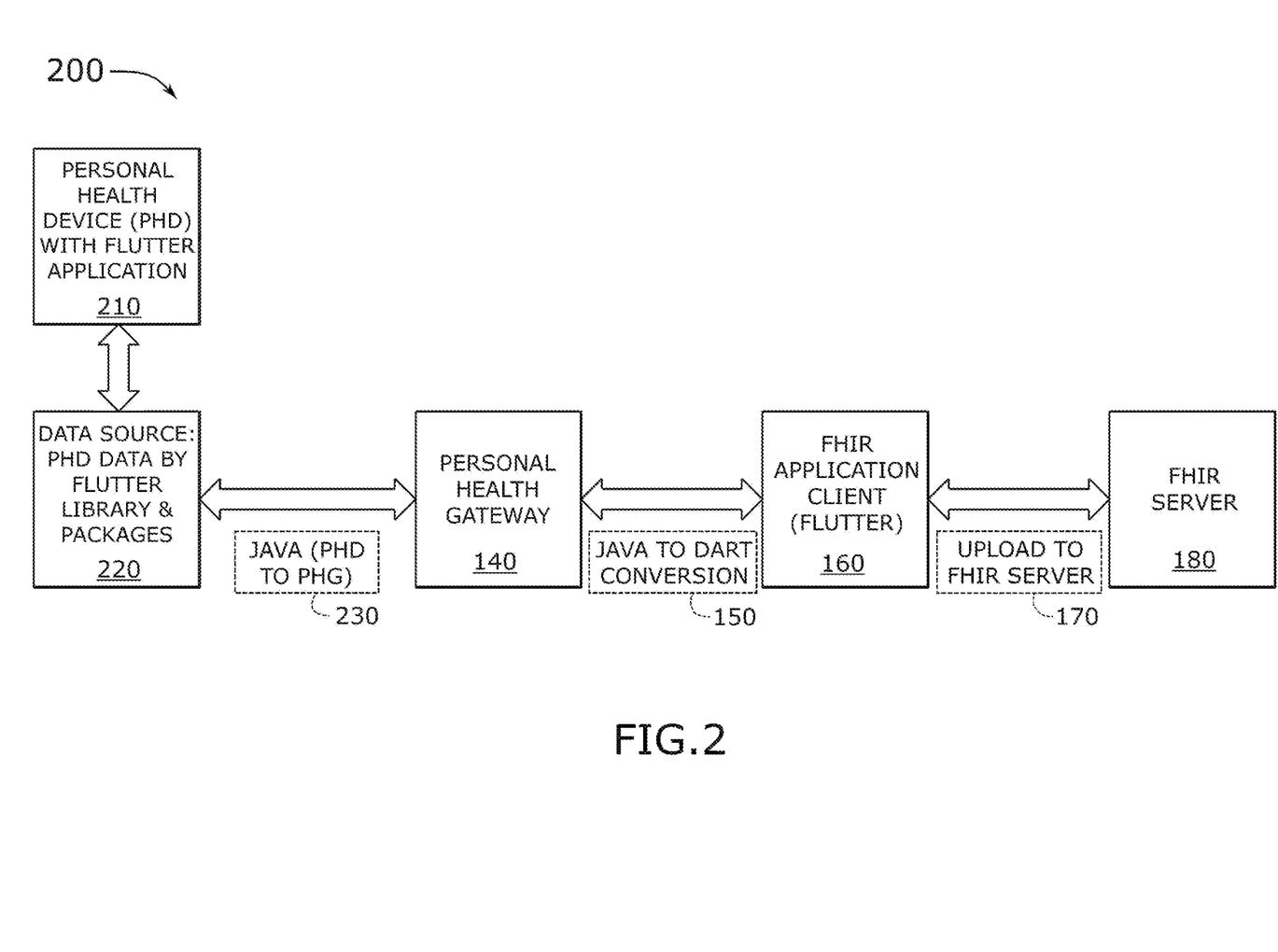
FIG. 2 conceptually illustrates seamless integration of a personal health device with a particular software application designed to run on any mobile device platform and which provides a software library and software packages configured to capture and provide data from the application on the personal health device for upload to the FHIR server in some embodiments.

Specifically, FIG. 2 conceptually illustrates seamless integration of a personal health device with a particular software application designed to run on any mobile device platform and which provides a software library and software packages configured to capture and provide data from the application on the personal health device for upload to the FHIR server 200. As shown in this figure, a personal health device (PHD) with a particular software application 210 provides a source of data based on a library and packages of the particular software application 220. The particular software application is an application that is designed according to the Flutter framework and, therefore, is referred to as the Flutter application on the PHD. The Flutter application may be configured to do anything, but for example, may pertain to mental health or other health aspects. The data is captured by the Flutter application such that the Flutter library and packages provide the data to the personal health gateway 140. However, as noted above, a decoding step occurs whereby Java is decoded. However, unlike the decoding step 130 described above, by reference to FIG. 1, the Java decoding step for the seamless integration of a personal health device with a particular software application designed to run on any mobile device platform and which provides a software library and software packages configured to capture and provide data from the application on the personal health device for upload to the FHIR server 200 involves decoding the Java of the personal health device to the personal health gateway 230.

Also, the personal health gateway 140 itself may be installed and/or included in the Flutter application running on the PHD, or may be a standalone appliance or included in a server that is communicably connected to the PHD. Nevertheless, when the data source is received by the personal health gateway 140 from the Flutter library and packages 220, then the Java to Dart conversion 150 starts. The Java to Dart conversion 150 is described in detail above, by reference to FIG. 1. Ultimately, the code conversion applies to the FHIR application client 160 which implements the Flutter framework to provide the application connection and data uploading from any device. Next, the FHIR application client 160 uploads the data 170, which was sourced by the Flutter library and packages on the PHD, to the FHIR server 180.

As such, the seamless integration of a personal health device with a particular software application designed to run on any mobile device platform and which provides a software library and software packages configured to capture and provide data from the application on the personal health device for upload to the FHIR server 200 demonstrates how a Flutter framework for an application on a personal health device can be provided in any specific or general domain (e.g., an app that anxious students may use as an outlet, or a general health app).

Besides providing seamlessly interchange of specific data for specific or general domains (as sourced from personal health appliances and/or applications built on a data interchangeable framework, such as Flutter), another kind of data in the mental health field pertains to digital phenotyping. For digital phenotyping, researchers and others are interested in the understanding the impact of technology on human behavior and health. This also can benefit from the data interchange that is seamlessly supported across multiple different device types and, therefore, retains relevance in any mobile sensing platform that utilizes the HL7 FHIR standard. In the next example, general device usage data is sourced from personal health devices for digital phenotyping, which is described next, by reference to FIG. 3.

Figure 3:
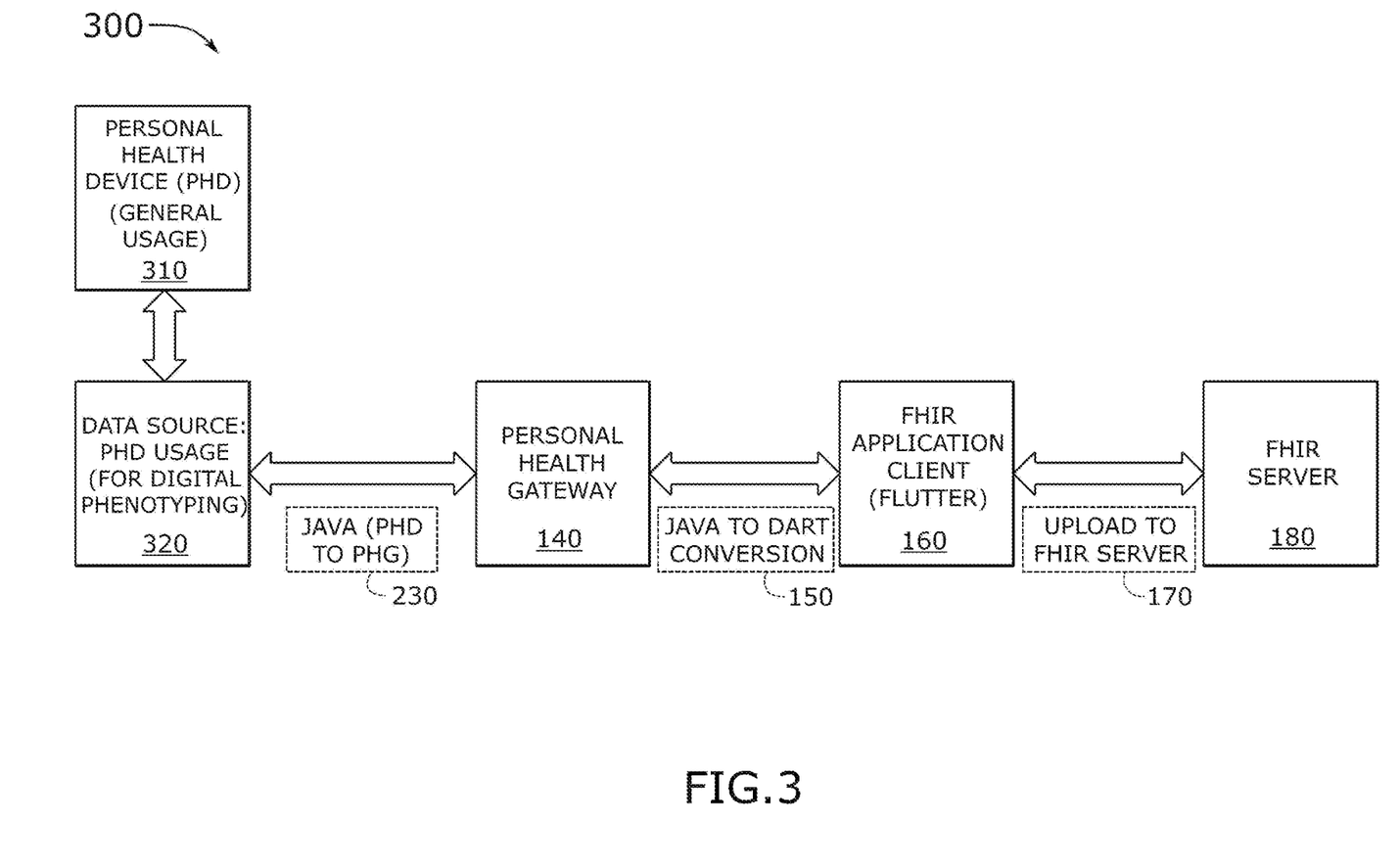
FIG. 3 conceptually illustrates seamless integration of a personal health device in which general data from the personal health device is uploaded to the FHIR server for digital phenotyping in some embodiments.

Specifically, FIG. 3 conceptually illustrates seamless integration of a personal health device in which general data from the personal health device is uploaded to the FHIR server for digital phenotyping 300. As shown in this figure, a personal health device 310 has general usage ongoing by a user and the data source 320 of interest is the general usage data of the personal health device 310 in order to be aggregated with other such data for digital phenotyping research, analysis, examination, etc. In this case, the data is general, so Java decoding from the personal health device 310 to the personal health gateway 230 is performed. The Java decoding of PHD to PHG 230 is the same as the Java decoding of PHD to PHG 230 described above, by reference to FIG. 2, save for the difference in data being sourced from the personal health device 310 in this case. Next, the Java to Dart conversion 150 occurs between the personal health gateway 140 and the FHIR application client 160. This is followed by the FHIR application client 160 uploading the data 170 to the FHIR server 180.

Figure 4:
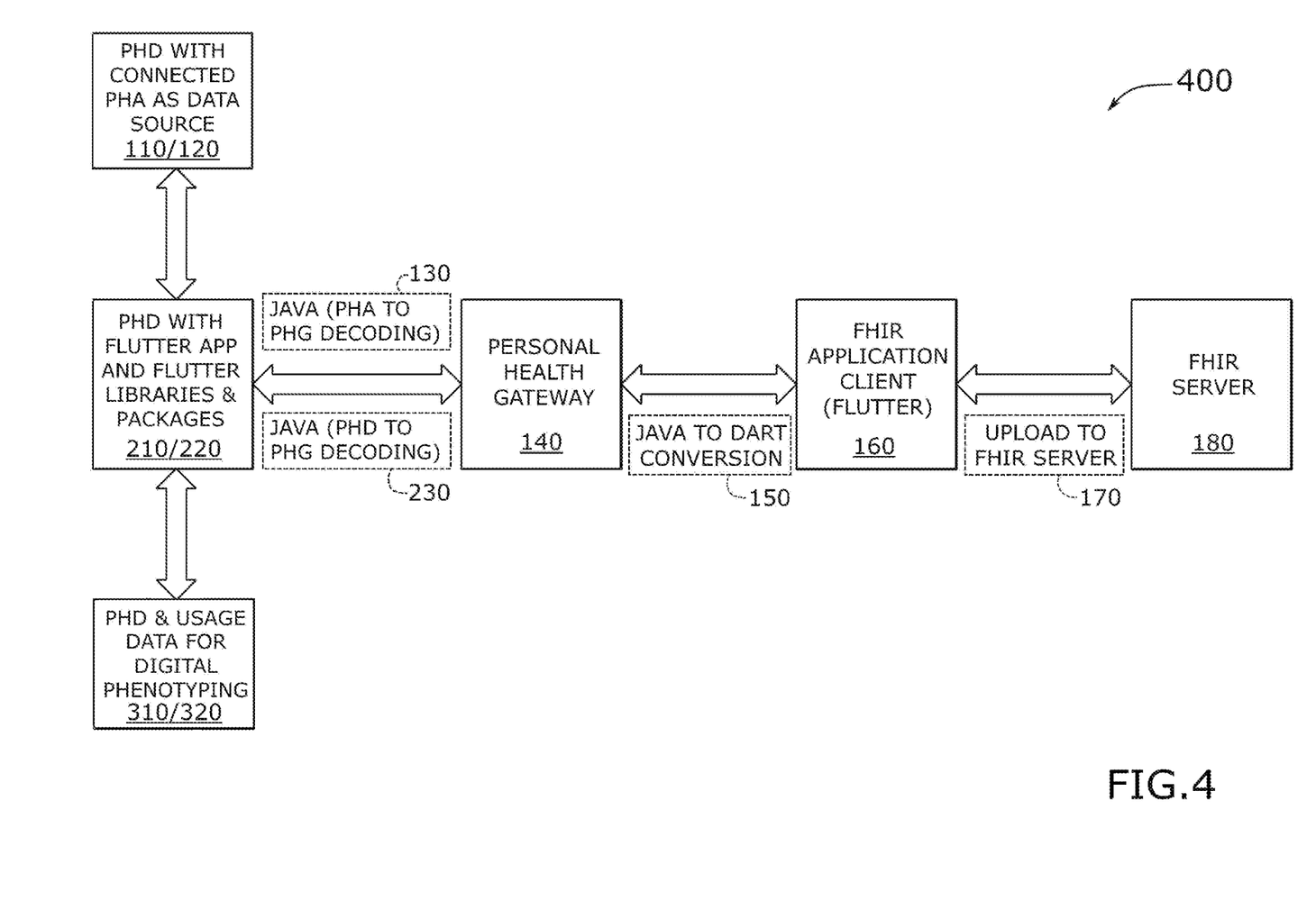
FIG. 4 conceptually illustrates seamless integration of a personal health device with the libraries and packages of the particular software application installed as a common provider of source data to upload to the FHIR server including personal health appliance data, application data, and usage data in some embodiments.

Turning now to another example, FIG. 4 conceptually illustrates seamless integration of a personal health device with the libraries and packages of the particular software application installed as a common provider of source data to upload to the FHIR server including personal health appliance data, application data, and usage data 400.

As shown in this figure, the seamless integration of a personal health device with the libraries and packages of the particular software application installed as a common provider of source data to upload to the FHIR server including personal health appliance data, application data, and usage data 400 involves the personal health device (PHD) with a connected personal health appliance (PHA) as the data source 110/120, as described above by reference to FIG. 1.

You also see that the PHD includes a Flutter application and the Flutter library and packages 210/220, as noted above, by reference to FIG. 2. Additionally, the PHD with usage data for digital phenotyping 310/320, as described above by reference to FIG. 3, are all demonstrated here. Thus, when the PHD does have a PHA connected and the Flutter application installed on the PHD, and when usage data is of particular interest, then the Flutter application library and packages are configured to perform both types of Java decoding, namely, the Java PHA to PHG decoding 130 for source data from the personal health device to the personal health gateway 140 and the Java PHD to PHG decoding 230 for usage data for digital phenotyping from the personal health device to the personal health gateway 140. This is followed, as noted above by reference to FIGS. 1-3, by the personal health gateway 140 converting the Java source data coding to the Dart coding format 150, such that after the conversion from Java to Dart 150, the source data is formatted in coding for Dart that is applicable and supported by the FHIR application client 160, which is built and designed as a Flutter application. Now the source data can be uploaded 170 by the FHIR application client 160 to the FHIR server 180.

While the example above refers to a single personal health device with at least one connected personal health device, a Flutter application installed, and a data usage interest for digital phenotyping, the next figure relates to different devices that each connect to a common personal health gateway. This is described next, by reference to FIG. 5.

Figure 5:
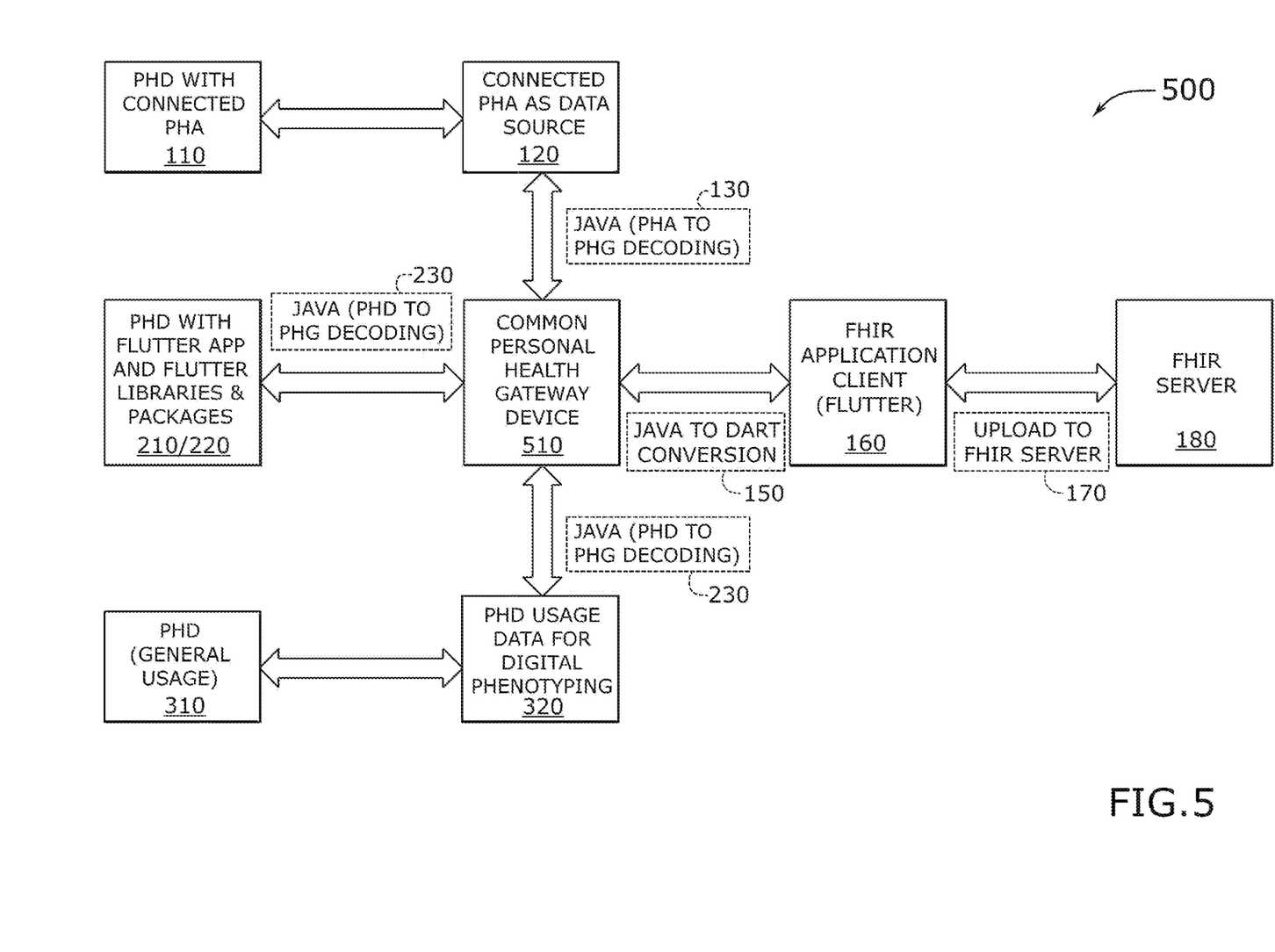
FIG. 5 conceptually illustrates a common personal health gateway device that provides seamless integration of three different devices including a first personal health device with a connected personal health appliance, a second personal health device with the particular application libraries and packages installed, and a third personal health device for digital phenotyping based on usage data in some embodiments.

In particular, FIG. 5 conceptually illustrates a common personal health gateway device that provides seamless integration of three different devices including a first personal health device with a connected personal health appliance, a second personal health device with the particular application libraries and packages installed, and a third personal health device for digital phenotyping based on usage data 500. As shown in this figure, there is a first personal health device with a connected personal health appliance 110 and the connected personal health appliance is used as the source of data 120. There is a second personal health device with a Flutter application 210 and the Flutter library and packages are used to source the data 220. There is also a third personal health device 310 that is used generally such that usage data is provide for digital phenotyping 320.

Unlike the examples described above, by reference to FIGS. 1-4, the personal health gateway 140 is not installed on the personal health device. Instead, a common personal health gateway device 510 is provided. Thus, in doing the Java decoding in each case—that is, the PHA to PHG decoding 130 and the PHD to PHG decoding 230—is configured to decode to Java for the common personal health gateway device 510.

This is followed by the common personal health gateway device 510 performing the conversion of Java to Dart 150 source code format for the FHIR application client 160, which then uploads 170 the data—sourced from each of the three personal health devices—to the FHIR server 180.

The above-described embodiments of the invention are presented for purposes of illustration and not of limitation. Furthermore, many of the above-described features and applications are implemented as software processes that are specified as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software" and "application" (or "app") are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
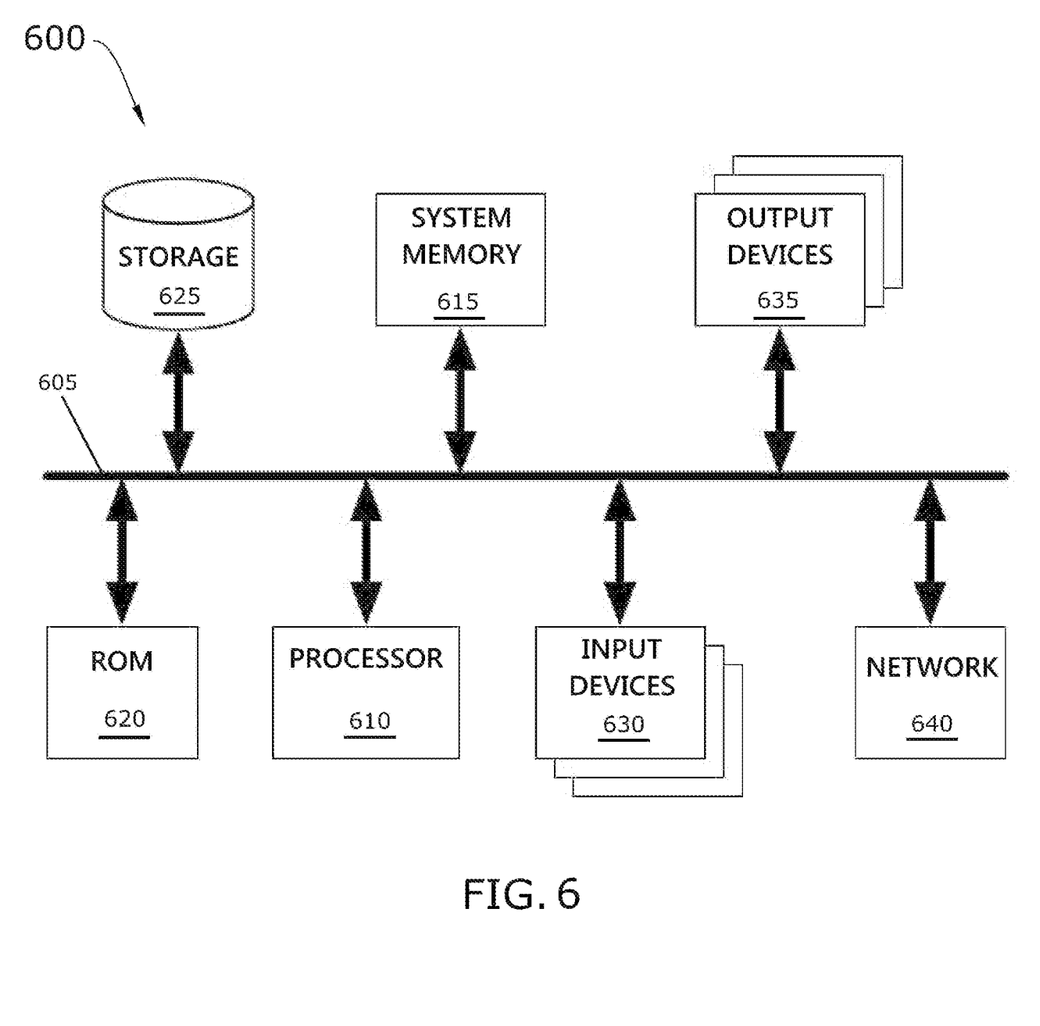
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive, or a solid state device (SSD), etc.) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only memory 620. For example, the various memory units include instructions for processing sensor data in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards, pointing or cursor control devices, touch gestures of users on touchscreen interfaces, communicably connected wearable devices (such as personal health appliances, smart watches, etc.). The output devices 535 include printers and display devices, such as liquid crystal displays (LCD) and organic light emitting diode (OLED) displays. Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-5 conceptually illustrates steps of methods or processes. The specific operations of these methods/processes may not be performed in the exact order shown and described. Specific operations may not be performed in one continuous series of operations, and different specific operations may be performed in different embodiments. Furthermore, the methods/processes could be

I claim:

1. A mobile sensing platform and system for mental healthcare that utilizes a Health Level Seven International (HL7) Fast Health Interoperability Resources (FHIR) standard for seamless integration of different mobile devices into a health system, said mobile sensing platform and system comprising:
   a FHIR server connected to a computer network system that leverages the HL7 FHIR standard and is configured to receive data (i) collected by a plurality of different types of devices that are remotely connected to the computer network system and (ii) converted to data that conforms to the HL7 FHIR standard;
   a personal health appliance (PHA) of a first user that is configured to capture personal health data of the first user in a specific Java data format;
   a first personal health device (PHD) that is operable by the first user and is configured to (i) capture general PHD usage data of the first user for digital phenotyping in the specific Java data format, (ii) receive, from the PHA, the personal health data of the first user in the specific Java data format when the first PHD is wirelessly connected to and paired with the PHA, and (iii) decode the specific Java data format of both the general PHD usage data of the first user and the personal health data received from the PHA into a decoded Java data format;
   a second PHD that is operable by a second user and is configured to (i) capture general PHD usage data of the second user for digital phenotyping in the specific Java data format and (ii) decode the specific Java data format of the general PHD usage data of the second user into the decoded Java data format;
   a personal health gateway device that is configured to (i) receive, from the first PHD, the decoded general PHD usage data of the first user and the decoded personal health data of the first user as a health data source of the paired first PHD and PHA, (ii) receive, from the second PHD, the decoded general PHD usage data of the second user, and (iii) convert the decoded personal health data of the first user, the decoded general PHD usage data of the first user, and the decoded general PHD usage data of the second user from the decoded Java data format to a Dart data format that conforms to the HL7 FHIR standard; and
   a FHIR application client that runs on the personal health gateway device and is configured to upload the Dart formatted data in conformance with the HL7 FHIR standard to the FHIR server for real time remote patient monitoring and for digital phenotyping, wherein the personal health data of the first user is accessible, after upload to the FHIR server, to a particular provider authorized to access the personal health data of the first user for remote patient monitoring and clinical decision support, wherein the general PHD usage data of the first user and the general PHD usage data of the second user are aggregated, after upload to the FHIR server, with other general device usage data for digital phenotyping research, analysis, and examination to determine an impact on users of technology usage.

2. The mobile sensing platform and system of claim 1 further comprising a third PHD operable by a third user, wherein the third PHD is configured to (i) capture raw data and (ii) format the raw data to the specific Java data format.

3. The mobile sensing platform and system of claim 2, wherein the third PHD comprises a software application that utilizes a software library and packages to decode the specific Java data formatted raw data into the decoded Java data format for the personal health gateway device.

4. The mobile sensing platform and system of claim 3, wherein the software application comprises a Flutter application.

5. The mobile sensing platform and system of claim 4, wherein the software library and packages comprise a Flutter library and Dart packages.

6. The mobile sensing platform and system of claim 5, wherein the personal health gateway device is a common personal health gateway (PHG) connected to the FHIR server over the computer network system, wherein the plurality of different types of devices connect to the common PHG by a wireless connection comprising at least one of a nearby wireless connection and a remote wireless connection.

7. The mobile sensing platform and system of claim 6, wherein the plurality of different types of devices comprises the first PHD operable by the first user, the second PHD operable by the second user, and the third PHD operable by the third user.

8. The mobile sensing platform and system of claim 7, wherein the first PHD and the second PHD are mobile devices, wherein the third PHD comprises one of a heart monitor the captures heart rate data of the third user and a fitness tracker that captures fitness data of the third user.

9. The mobile sensing platform and system of claim 8, wherein the first PHD is supported by a first mobile device platform and the second PHD is supported by a second mobile device platform that is different from the first mobile device platform.

10. The mobile sensing platform and system of claim 9, wherein the first mobile device platform comprises Android and the second mobile device platform comprises iOS.

11. The mobile sensing platform and system of claim 1, wherein the personal health gateway is a common personal health gateway device that is configured to receive decoded data from each of the plurality of different types of devices.

12. The mobile sensing platform and system of claim 11, wherein each of the different types of devices corresponds to a different mobile device platform that captures raw data in a format that is different from the format of data captured by the other types of devices.

* * * * *